US010984670B2

(12) United States Patent
King et al.

(10) Patent No.: US 10,984,670 B2
(45) Date of Patent: *Apr. 20, 2021

(54) MANAGEMENT OF OFF-TASK TIME IN A PARTICIPATORY ENVIRONMENT

(71) Applicant: PRESIDENT AND FELLOWS OF HARVARD COLLEGE, Cambridge, MA (US)

(72) Inventors: Gary King, Brookline, MA (US); Brian Lukoff, Boston, MA (US); Eric Mazur, Concord, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 242 days.

This patent is subject to a terminal disclaimer.

(21) Appl. No.: 15/940,045

(22) Filed: Mar. 29, 2018

(65) Prior Publication Data

US 2018/0225984 A1    Aug. 9, 2018

Related U.S. Application Data

(63) Continuation of application No. 13/871,641, filed on Apr. 26, 2013, now Pat. No. 9,965,972.

(60) Provisional application No. 61/639,263, filed on Apr. 27, 2012.

(51) Int. Cl.
*G09B 7/02* (2006.01)
(52) U.S. Cl.
CPC .................................... *G09B 7/02* (2013.01)
(58) Field of Classification Search
CPC ........................................................ G09B 7/02

USPC ........................................................ 434/362
See application file for complete search history.

(56) References Cited

U.S. PATENT DOCUMENTS

| | | | |
|---|---|---|---|
| 3,594,505 A | 7/1971 | Price, Jr. et al. | |
| 5,002,491 A | 3/1991 | Abrahamson et al. | |
| 5,453,015 A | 9/1995 | Vogel | |
| 8,914,873 B2 | 12/2014 | Kivinen et al. | |
| 9,508,266 B2 | 11/2016 | King et al. | |
| 9,965,972 B2 | 5/2018 | King et al. | |
| 2002/0160347 A1* | 10/2002 | Wallace .................. | G09B 7/06 434/322 |
| 2006/0155513 A1 | 7/2006 | Mizrahi et al. | |
| 2010/0035225 A1 | 2/2010 | Kerfoot, III | |
| 2011/0230262 A1 | 9/2011 | Shan | |
| 2011/0251866 A1 | 10/2011 | Sengupta | |
| 2012/0088222 A1 | 4/2012 | Considine et al. | |

(Continued)

FOREIGN PATENT DOCUMENTS

WO    2012034086 A2    3/2012

OTHER PUBLICATIONS

International Preliminary Report on Patentability dated Oct. 28, 2014 for International Patent Application PCT/US2013/038395 filed Apr. 26, 2013, 7 pages.

(Continued)

*Primary Examiner* — Thomas J Hong
(74) *Attorney, Agent, or Firm* — Quarles & Brady LLP

(57) ABSTRACT

Participatory activity carried out using electronic devices is enhanced by occupying the attention of participants who complete a task before a set completion time. For example, a request or question having an expected response time less than the remaining answer time may be provided to early-finishing participants.

20 Claims, 8 Drawing Sheets

(56) References Cited

U.S. PATENT DOCUMENTS

2012/0164619 A1    6/2012  Meer
2012/0208166 A1    8/2012  Ernst et al.

OTHER PUBLICATIONS

International Search Report and Written Opinion dated Aug. 9, 2013 for International Application No. PCT/US2013/038395, 8 pages.

\* cited by examiner

MANAGEMENT OF OFF-TASK TIME IN A PARTICIPATORY ENVIRONMENT

CROSS-REFERENCES TO RELATED APPLICATIONS

This application is a continuation of U.S. application Ser. No. 13/871,641, filed on Apr. 26, 2013, which claims priority to and the benefit of U.S. Provisional Patent Application No. 61/639,263, which was filed on Apr. 27, 2012. Each of these applications is hereby incorporated by reference in its entirety for all purposes.

GOVERNMENT RIGHTS

This invention was made with Government support under National Science Foundation award IIS-0835338. The Government has certain rights in the invention.

FIELD OF THE INVENTION

In various embodiments, the present invention relates generally to efficiently managing off-task time of participants in a participatory environment.

BACKGROUND OF THE INVENTION

Acquiring new skills or knowledge traditionally involves lectures, where an instructor orally presents material to an audience of participants. Participant involvement, unfortunately, tends to be limited to asking questions when confusion arises. Such one-way communication discourages critical thinking and has been shown to do little to improve the participants' understanding of the presented concepts.

Various teaching methods incorporating active audience participation encourage engagement, enhance attention, and allow the instructor to immediately evaluate the audience's comprehension of new material. For example, a handheld device (e.g., a radio-frequency enabled "clicker" or a smart phone) or web connectivity to a class website allows the audience to transmit answers to questions posed by the instructor using a bi-directional communication system; the answers are collected and presented as, for example, graphical displays, which indicate the degree of class comprehension of the questions. Based on the rapid feedback, the instructor may modify the material and/or teaching pace to ensure that satisfactory audience comprehension has been achieved prior to moving on to the next topic; this improves effectiveness teaching and provides the audience deeper understanding of the material.

Teaching approaches utilizing audience response or web connectivity, however, suffer from a generic problem—a quick-responding participant may respond to an item earlier than other participants and sit idle as she waits for other participants to complete their responses. During this idle or "off-task" time, the quick-responding participant may use the handheld device for non-event-related tasks, such as checking email or logging onto a website such as FACEBOOK. From a pedagogical point of view, such off-task time represents a lost opportunity and, in addition, may hold back the progress of peer instruction and collaborative teaching methods.

Consequently, there is a need for an approach that can effectively and engagingly utilize off-task time, thereby increasing learning productivity.

BRIEF SUMMARY OF THE INVENTION

Embodiments of the present invention effectively manage the off-task time by instantly providing the quick-responding participants with various post-response tasks via their electronic devices; this ensures continuous engagement of all participants in an event. In one embodiment, the post-response tasks are the same for all participants. In another embodiment, the post-response tasks are different for each participant, depending upon, for example, the rate at which the participant has successfully provided answers to previous questions. For example, if the participant has demonstrated sufficient understanding of the material, post-response tasks assigned to the participant may involve more nuanced questions designed to facilitate a deeper understanding of the content. If, however, the participant has answered the posed question incorrectly, the post-response tasks may involve basic conceptual questions designed to correct any misunderstanding of the material. In some embodiments, the post-response tasks are tasks that an instructor (not necessarily the instructor of the quick-responding participant) is pretesting for future use with her own students.

In other embodiments, the post-response tasks are lectures or videos, delivered to the participant, that relate to the content of the material. Again, each participant may be presented the same or different lectures/videos, depending on her comprehension of the material. In addition, the post-response tasks presented to each participant may be determined based on the time remaining to answer the originally posed question. These post-response tasks are thus adapted to the answers given by each participant and/or the remaining time before the answer time elapses, thereby providing the quick-responding participants an efficient way to utilize their time, keeping them actively engaged in the event, and helping them to develop a deeper understanding of the material.

In various embodiments, the instructor sets the answer time to expire when a certain number (e.g., above a threshold percentage) of participants have entered their answers; upon expiration of the answer time the instructor stops accepting answers and moves on with the discussion. As a result, the quick-responding participants are no longer allowed to answer the post-response tasks. In one embodiment, the instructor adjusts the answer time based on the number of received answers and a percentage of the post-response tasks that have been completed. This allows the instructor to dynamically adjust the pace of the event, thereby optimizing the usage of time for all participants in the event. Additionally, after the participants respond to the posed question, the display of their electronic devices may be controlled until the answer time to the question has elapsed; this ensures that the participant does not wander to websites or applications unrelated to the activity.

Accordingly, in one aspect, the invention pertains to a method of orchestrating activity among participants having electronic devices. In various embodiments, the method includes the steps of posing to the participants a question having an associated answer time; detecting answers to the question entered via the electronic devices; and if an answer is detected before the answer time has elapsed, posing a request on the electronic device. The request has an expected response time less than the remaining answer time. In one implementation, the method further includes aggregating data indicative of participant time required to answer the question and/or whether participants who received the request responded thereto. The answer time is then adjusted based at least in part on the data.

The request displayed on the electronic device may be determined based at least in part on an answer given by a participant to the question. Additionally, the requests may vary over time as more answers are given. The method may further include adjusting the question based at least in part on responses to the request. In addition, the method may include using the answers to the question and/or the responses to the request to build a profile of a participant's ability level.

In various embodiments, each electronic device is associated with a participant and the participants have been grouped, the request directed to a participant's electronic device being based at least in part on an answer given, via an electronic device, by other participants. The participant and at least one of the other participants are in a same or a different group. In one embodiment, the method further includes controlling a display of a participant's electronic device after a response has been provided but before the answer time has elapsed.

In another aspect, the invention relates to a system for orchestrating activity among multiple participants in an activity, each of whom has an electronic device. In various embodiments, the system includes a communication interface for communicating with the electronic devices; and a memory for storing (i) a participant database having a record for each of the participants, each record specifying a participant identifier and an identifier for the participant's electronic device, (ii) a question database having records corresponding to multiple questions each associated with an answer time, and (iii) a request database having records corresponding to requests; and a processor in operative communication with the memory. In one implementation, the processor is configured to (i) retrieve a question from the question database, (ii) detect answers to the question entered via the electronic devices, and (iii) if an answer is received from an answering electronic device before the answer time has elapsed, retrieve a request from the request database and cause transmission thereof to the answering electronic device. The request has an expected response time less than the remaining answer time.

The processor may be further configured to aggregate data indicative of participant time required to answer the question and/or whether participants who received the request responded thereto. In addition, the processor may be configured to adjust the answer time based at least in part on the data.

The processor may be further configured to retrieve the request based at least in part on an answer given by the participant to the question. In addition, the processor may be configured to retrieve the request based at least in part on an answer given, via an electronic device, by other participants. In one embodiment, the processor is configured to adjust the question based at least in part on responses to the request. Further, the processor may be configured to build a profile of a participant's ability level based at least in part on at least one of answers to the question or responses to the request. In some embodiments, the processor is further configured to control, via the communication interface, a display of the electronic devices after responses have been provided but before the answer time has elapsed.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, routines, steps, or characteristics may be combined in any suitable manner in one or more examples of the technology. The terms "substantially" and "approximately" mean that a participant gives correct answers at a rate within ±10% of other participants' and, in some embodiments, within ±5% of other participants'. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION OF THE INVENTION

As used herein, the term "event" or "activity" refers to a gathering of "participants" led by one or more "instructors" in which the instructors desire to use handheld devices to measure participants' attitudes, opinions, knowledge, or understanding of the relevant subject matter. The most common case consists of students attending a class led by a professor or graduate student who wants to gauge student understanding of the content. However, participants need not be in the same room as each other or the instructor, so events encompass distance learning situations. In addition, participants need not be students; they might be employees participating in a corporate training event, or workshop participants attending a workshop where the session leader wishes to gauge the opinions of the participants. As used herein, the term "item" refers to a question or request that an instructor poses to participants during an event or an activity; participants respond to items using handheld electronic devices. Items may or may not have a correct answer and may have any response format (i.e., they need not be multiple-choice). Items may attempt to assess factual information, tease out conceptual difficulties, or measure participants' opinions. The term "electronic device" as used herein broadly connotes any device or system facilitating wired and/or wireless bi-directional communications, and may include computers or handheld devices such as smart phones or other personal communication devices. Smart phones include mobile phones or tablets capable of executing locally stored applications and supporting wireless communication and data transfer via the Internet or the public telecommunications infrastructure. Smart phones include, for example, IPHONES (available from Apple Inc., Cupertino, Calif.), BLACKBERRIES (available from RIM, Waterloo, Ontario, Canada), or any mobile phones equipped with the ANDROID platform (available from Google Inc., Mountain View, Calif.); tablets, such as the IPAD and KINDLE FIRE; and personal digital assistants (PDAs). The bi-directional communication and data transfer can take place via, for example, one or more of cellular telecommunication, a Wi-Fi LAN, a point-to-point Bluetooth connection, and/or an NFC communication.

Although the present discussion focuses in part on students in a college classroom environment, it should be understood that the approach described herein is applicable to participants in any group pedagogical or intellectual endeavor, and the terms "student" and "participant" are used herein interchangeably. In addition, the term "instructor" used herein is not limited to a teacher or a professor in the classroom; the "instructor" may be a facilitator in a corporate event or in any group pursuing a pedagogical or intellectual endeavor.

Figure 1:
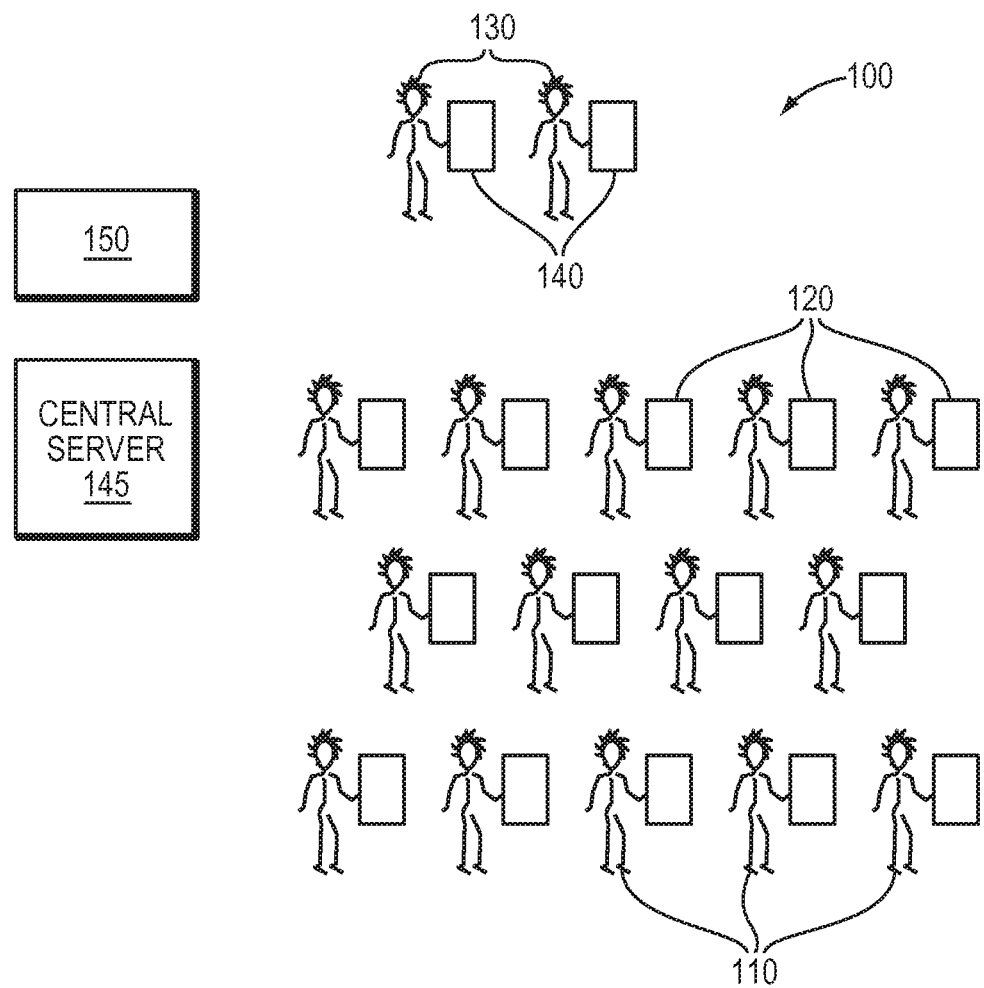
FIG. 1 schematically illustrates an event involving a gathering of participants and one or more instructors.

FIG. 1 depicts an exemplary event or activity 100 where a gathering of participants 110, each having an electronic device 120, is led by one or more instructors or organizers 130, who may each have an electronic device 140. The participants 110 and the instructor(s) 130 may directly communicate via the electronic devices 120, 140 or indirectly via a central server 145. The electronic devices 140, for example, may allow the instructor(s) to transmit subject matter or an item to the participants 110. The subject matter or the item may be a question, a discussion topic, a lecture or a video that the instructor(s) 130 pose(s) to participants 110 during the activity. Similarly, the electronic devices 120 may transmit participants' responses, attitudes, opinions, knowledge, characteristics, and/or understanding of relevant subject matter or items to the instructor(s) 130 and/or to the central server 145. In one embodiment, participants 110 are students, the activity 100 is a class and the instructor 130 is a professor or teacher who wishes to gauge student understanding of the content. The students 110 may be co-located or geographically dispersed (e.g., distance learning classes). In another embodiment, the activity 100 is a corporate training event attended by employees or a workshop attended by workshop participants where the session leader wishes to gauge the opinions of the participants. A person of ordinary skill in the art will appreciate that the invention described herein may be applicable to any group of participants pursuing pedagogical or intellectual endeavors.

Figure 2A:
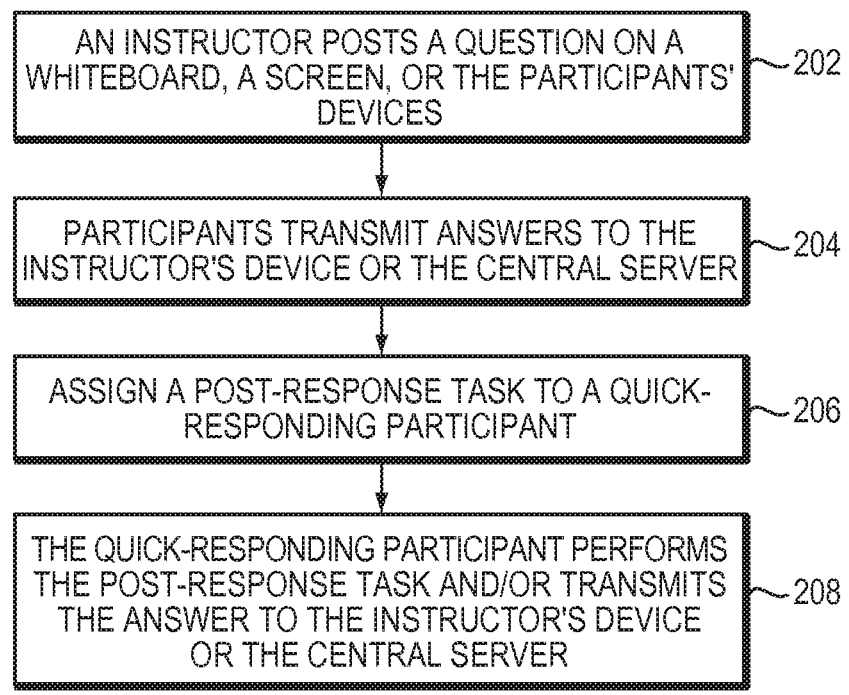
FIGS. 2A-2E depict various approaches for managing the off-task time of quick-responding participants in an event in accordance with various embodiments of the invention.

Referring to FIG. 2A, during the event, the instructor 130 may first pose a question on, for example, a whiteboard, a screen 150, or may transmit it to the participants' devices 120 using his own device 140 and/or the central server 145 (step 202). After reading the question and determining an answer thereto, the participants 110 may wirelessly or otherwise (e.g., by a wired connection) transmit their answers directly to the instructor's device 140 or indirectly via the central server 145 (step 204). If an answer from a quick-responding participant 110 is received prior to the expiration of the answer time set by the instructor 130, the instructor's device 140 or the central server 145 may instantly assign a new task, i.e., a post-response task, to the participant's device 120 automatically or upon a request from the instructor 130 (step 206). The post-response task may take various forms and may be the same or different for each participant: for example, in some instances the post-response task may be a generic request to articulate the reasoning behind the participant's choice of response; in other instances the task may be may be a multiple-choice question or a question requiring a typed response, i.e., a free response. The quick-responding participant 110 may, again, enter her selection or explanation using the device 120 that, typically, can later communicate with the instructor's device 140 directly or indirectly (step 208). Alternatively, the post-response task may be a request to explain the reasons as to why other possible response(s) (i.e., the one(s) different from the participant's selected answer) were not correct. In still other instances, the post-response task may be a presentation or a video of a brief lecture or a new question related to the current discussion or further discussion of the subject matter.

In some embodiments, the post-response tasks assigned to each quick-responding participant 110 are tasks that are being pre-tested by another instructor, to give that instructor information on how the tasks will be received by that instructor's own students. This approach is in accordance with a co-pending application, filed on even date herewith and entitled "CROSS-CLASSROOM AND CROSS-INSTITUTION ITEM VALIDATION," the entire disclosure of which is hereby incorporated by reference.

Figure 2B:
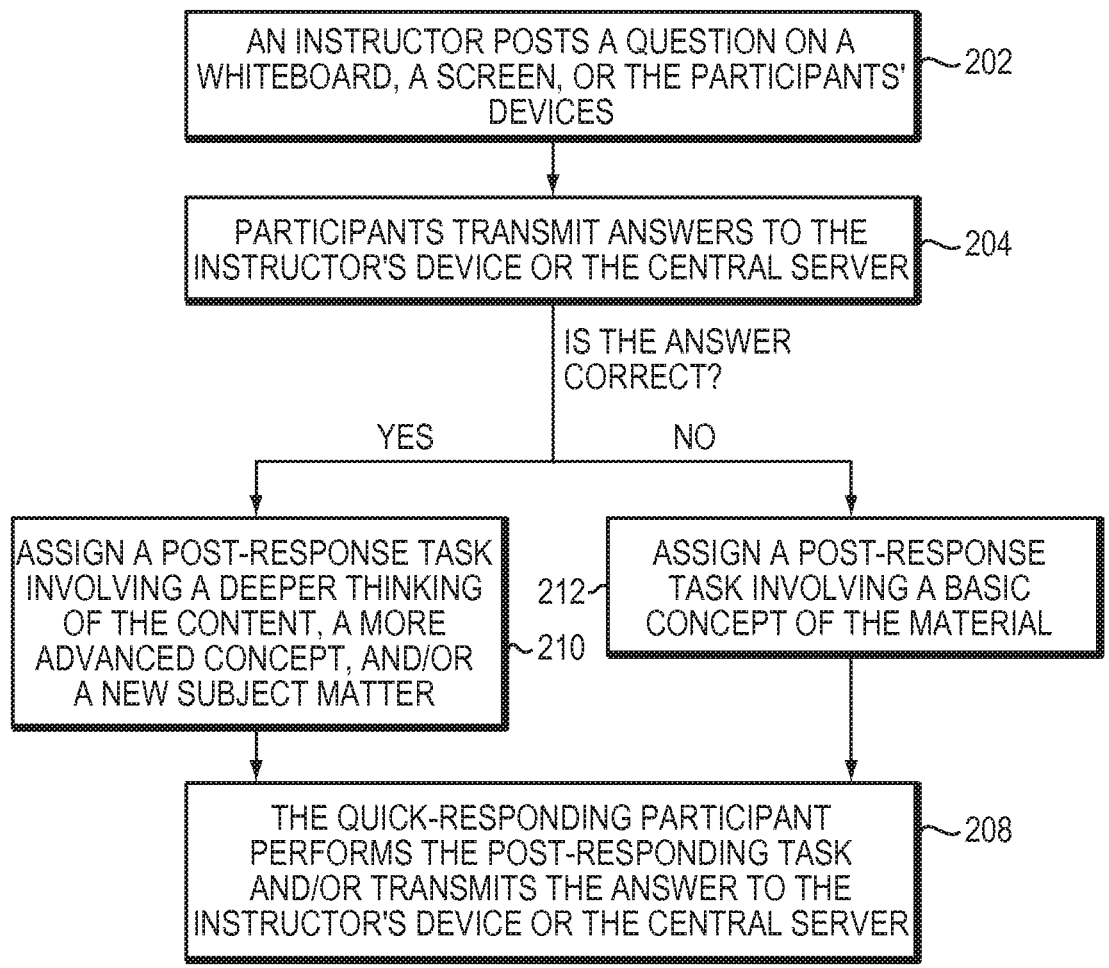

Referring to FIG. 2B, in various embodiments, the post-response task is different for each participant 110, depending on the degree of comprehension she has demonstrated with regard to the material being taught. For example, if the participant 110 has chosen a correct answer to the posed question, the post-response task may involve a more in-depth question about the current material, a more advanced concept, and/or new subject matter (step 210). If, however, the participant 110 has incorrectly answered the posed question, the post-response task assigned to the participant may be a basic conceptual question designed to elucidate fundamental principles of the material (step 212). Additionally, based on the incorrect answer that the participant 110 has selected, the post-response task presented to the participant may be particularly relevant to correcting misconceptions that led him to answer incorrectly; this may help the participant 110 review the material and/or develop a correct understanding prior to listening to an explanation from the instructor 130. Accordingly, the post-response tasks assigned to each participant 110 may be customized on a question-by-question basis—e.g., the performance on the previous question(s) can determine the difficulty of the post-response task.

Figure 2C:
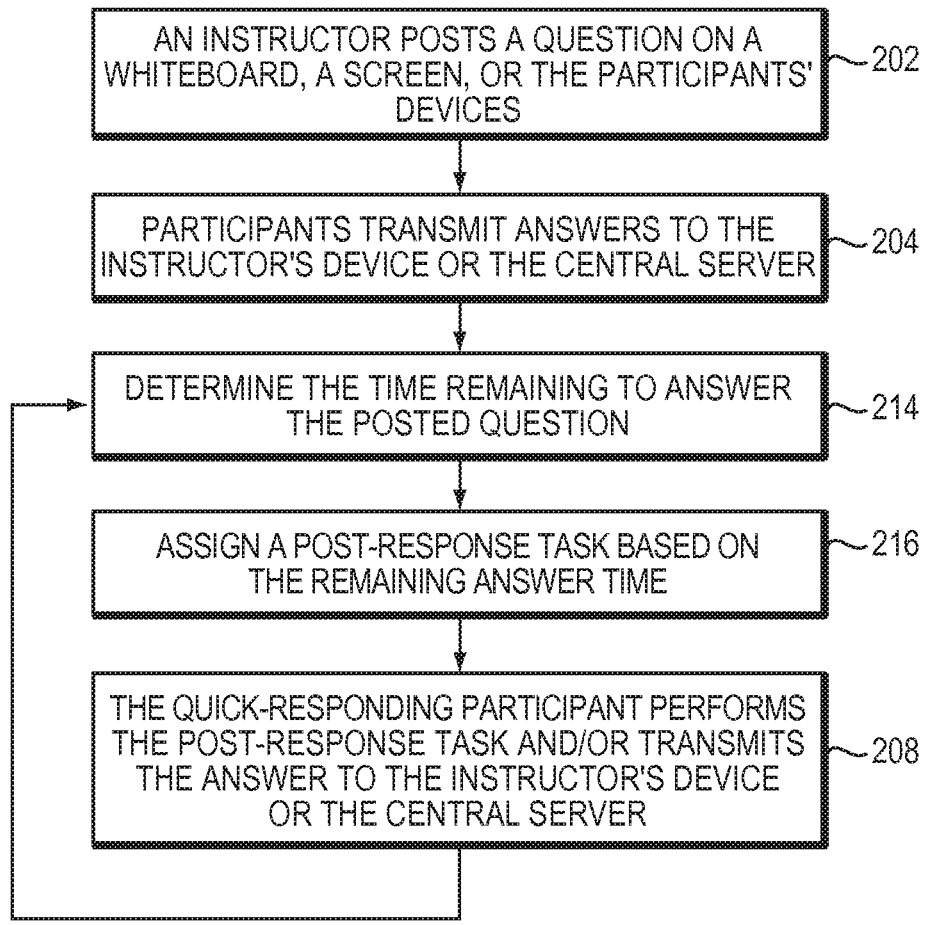
Figure 2D:
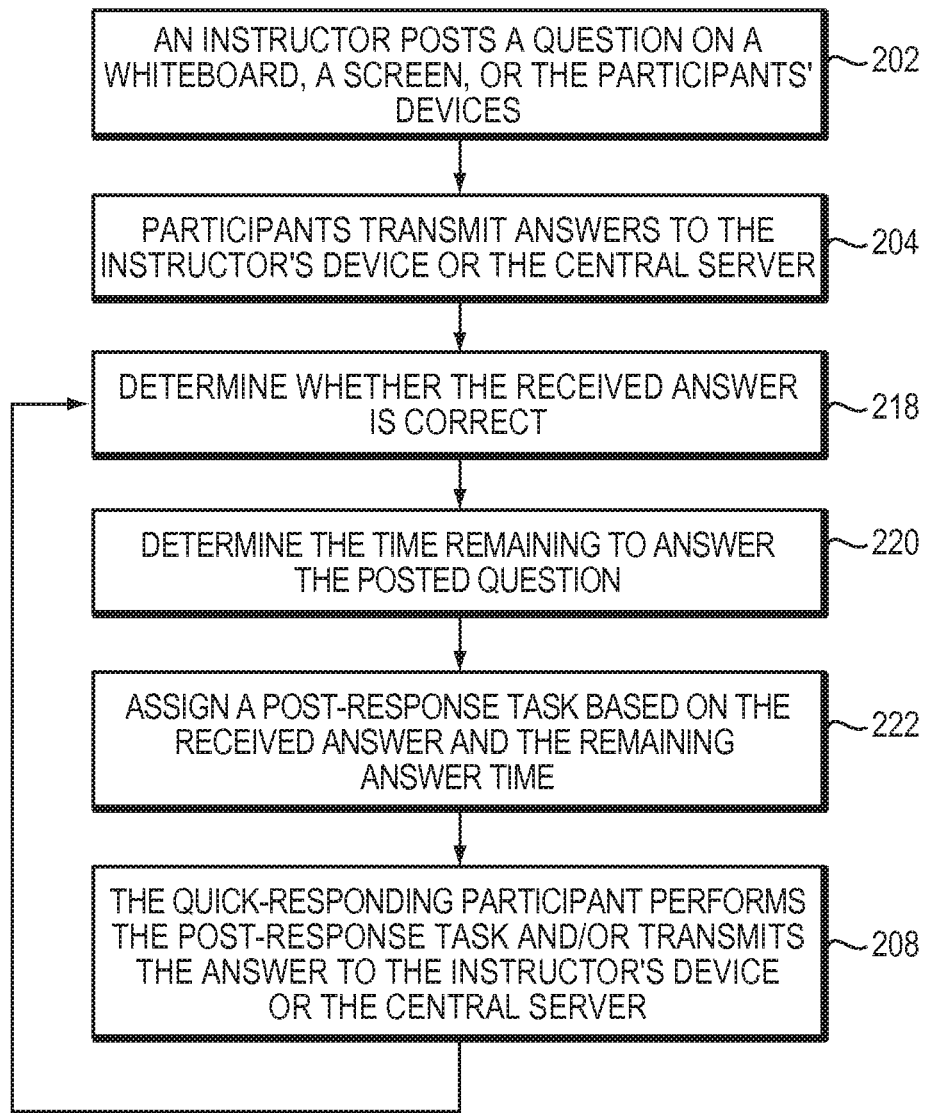

In one embodiment, the time to answer the posed question is predetermined by the instructor 130 prior to the beginning of activity 100. Because the post-response task is expected to be completed within the time remaining to answer the originally posed question (i.e., between the time when the answer to the originally posed question is received and the expiration of the answer time), the post-response task presented to each participant 110 may be dictated by the remaining answer time that each participant 110 has. Referring to FIG. 2C, for example, upon receiving the answer, the instructor's device 140 or the central server 145 may determine how much time is left before the answer time is over (step 214) and assign the post-response task based on the remaining answer time (step 216). If, for example, there are two minutes left before the answer time is over, the instructor's device 140 or the central server 145 may display a two-minute video to the participant 110. If, however, there are only thirty seconds left, the device 140 or the central server 145 may display a short paragraph of text relevant to the topic of discussion. In some embodiments, multiple post-response tasks are sequentially assigned to the quick-responding participants until the answer time expires—that is, a new task is assigned when the participant completes the current task until time runs out. Referring to FIG. 2D, in some embodiments, the post-response task is presented to each participant 110 utilizing a combination of adaptations to the rate at which the participant has successfully provided answers to previous questions and the remaining answer time to the posed question (steps 218, 220, 222); this therefore allows the quick-responding participant 100 to maximize her learning efficiency and keep her attention focused on the activity.

Figure 2E:
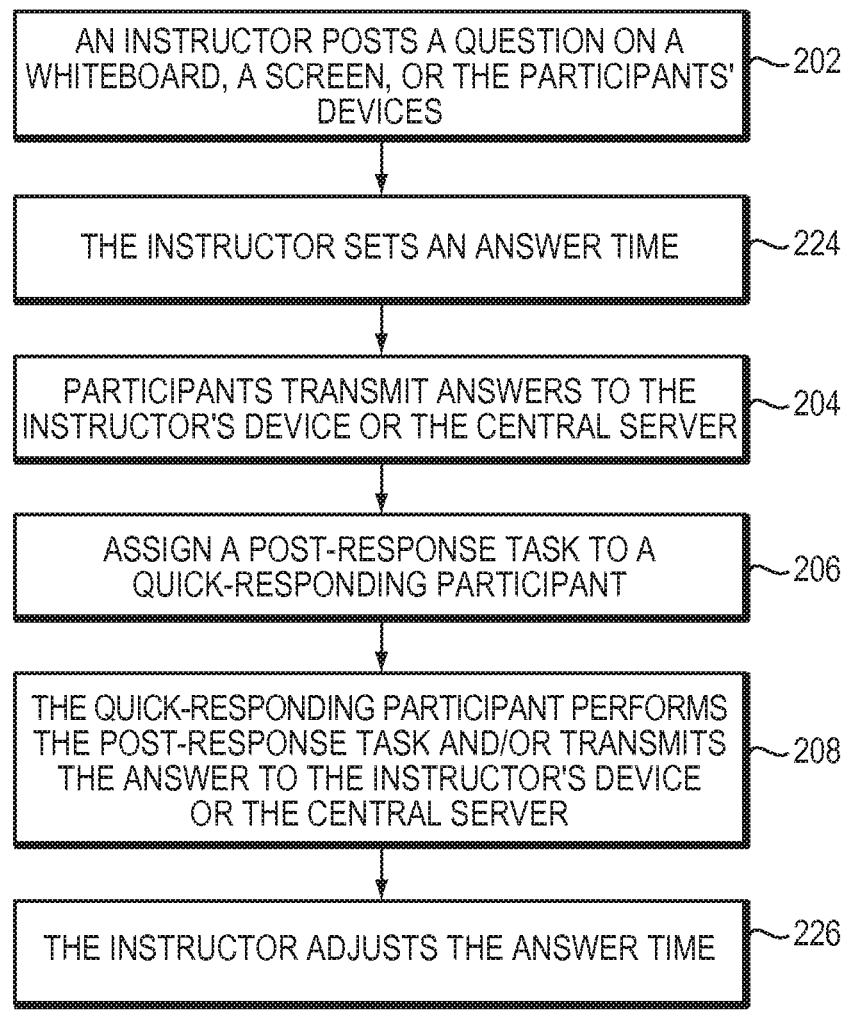

Referring to FIG. 2E, in another embodiment, the answer time is set by the instructor 130 during the activity. For example, the instructor 130 may set the answer time to expire when a certain number (e.g., above a threshold percentage, such as 50%) of the participants 110 have entered their answers (step 224). This may help the instructor 130 to balance her teaching progress with the participants' ability to absorb new material. To boost the rate of completion of post-response tasks before expiration of the answer time, the instructor 130 may dynamically adjust the answer time, allocating, for example, more time to answer based on the number of answers received to the originally posed question and a percentage of the post-response tasks that have been completed (step 226). This ensures that most quick-responding participants 110 complete their post-response tasks before the instructor 130 proceeds to the next task.

The information provided in the responses to the post-response tasks (such as the participant's reasoning behind each selected or unselected answer) may be analyzed to improve subsequent versions of the question. In addition, the quality of post-response tasks may be assessed in terms of how long the participants remain engaged therewith. For example, the submission time of the post-response task may indicate the time necessary for the participant to complete the task; this information may be further abstracted into criteria for designing effective post-response tasks. In various embodiments, the participants' responses to the originally posed question and/or post-response tasks are analyzed to build profiles of each participant's level of ability in the subject matter. For example, if the originally posed question is about Ohm's Law in physics and the post-response question is a second question about Ohm's Law, correct responses on both questions yield more confidence of the participant's understanding of Ohm's Law than if she had answered only the originally posed question correctly. Once a system in accordance herewith has been used with the same or a similar group of participants 110 and experiential data has been developed, statistical methods (adapted from this or other areas) may be used to determine the best use of the information obtained from responses to the posed questions and/or post-response tasks. By engaging the quick-responding participants with these, or other, content-relevant tasks, their non-event-related tasks in the post-response time are minimized and learning is maximized.

In some embodiments, the participants' responses to the posed question and/or post-response tasks are further analyzed to group the participants, which may be particularly useful in a peer-instruction approach for achieving productive conversations. For example, a simple policy for automatically grouping the participants 110 may require each group to include two or more participants who have chosen different answers and/or have different misconceptions to the posed question; see, e.g., U.S. Ser. No. 13/458,040, filed on Apr. 27, 2012, the entire disclosure of which is hereby incorporated by reference.

In various embodiments, the participants 110 are kept engaged following completion of the posed task by integrating a video capture system and showing a class-related video stream, e.g., of the instructor 130 and/or a whiteboard on the participants' electronic devices 120. More generally, the instructor's device 140 and/or the central server 145 may determine what the participants 110 see on their electronic devices 120 depending on the instructor's current pedagogical activity: for example, when the instructor 130 is lecturing, the instructor's PowerPoint slides or other presentation software may be displayed on the participants' devices 120; if the instructor 130 is delivering an item, the participants 110 may see the item prompt (and response options, for multiple-choice items) and thereby interact with their devices 120 to respond to the item.

To ensure that that the participants 110 do not wander to websites or applications unrelated to the current discussion topic, various approaches may be deployed. In one embodiment, the participants 110 are required to log into a website associated with the activity. Although this may not prevent the participants 110 from launching additional instances of their web browsers and toggling among various websites, the provision of engaging content on the activity website (which may be combined, for example, with the unpredictable appearance of material that is relevant to an upcoming quiz or exam) may discourage excessive web surfing—or at least reduce it from otherwise prevalent levels. In another embodiment, a proxy server may be injected into the wireless local area network to block access to everything but the desired site or stream relevant to the activity; again, while this may not preclude the participants 110 from using their devices 120 to access other web content, it may reduce the overall frequency of inattention. Alternatively, prior to joining the activity, the participants 110 may be required to install an application on their devices 120. This application allows the participants 110 to interact with the instructor 130 (e.g., entering their responses to the posed question) during the activity. In addition, the application, when activated, may prevent initiation of other applications. As a result, once the participants 110 have launched the application at the beginning of the activity, they cannot perform any irrelevant tasks using other applications without closing the current application. Because activating and deactivating the application may take time and potentially result in missing a response to the instructor's question, the participants 110 may be less likely to wander away from the activity. It is expressly noted that these approaches to preventing participants' attention from wandering are exemplary only, and any approach suitable for reducing participant distraction is within the scope of the current invention.

Figure 3:
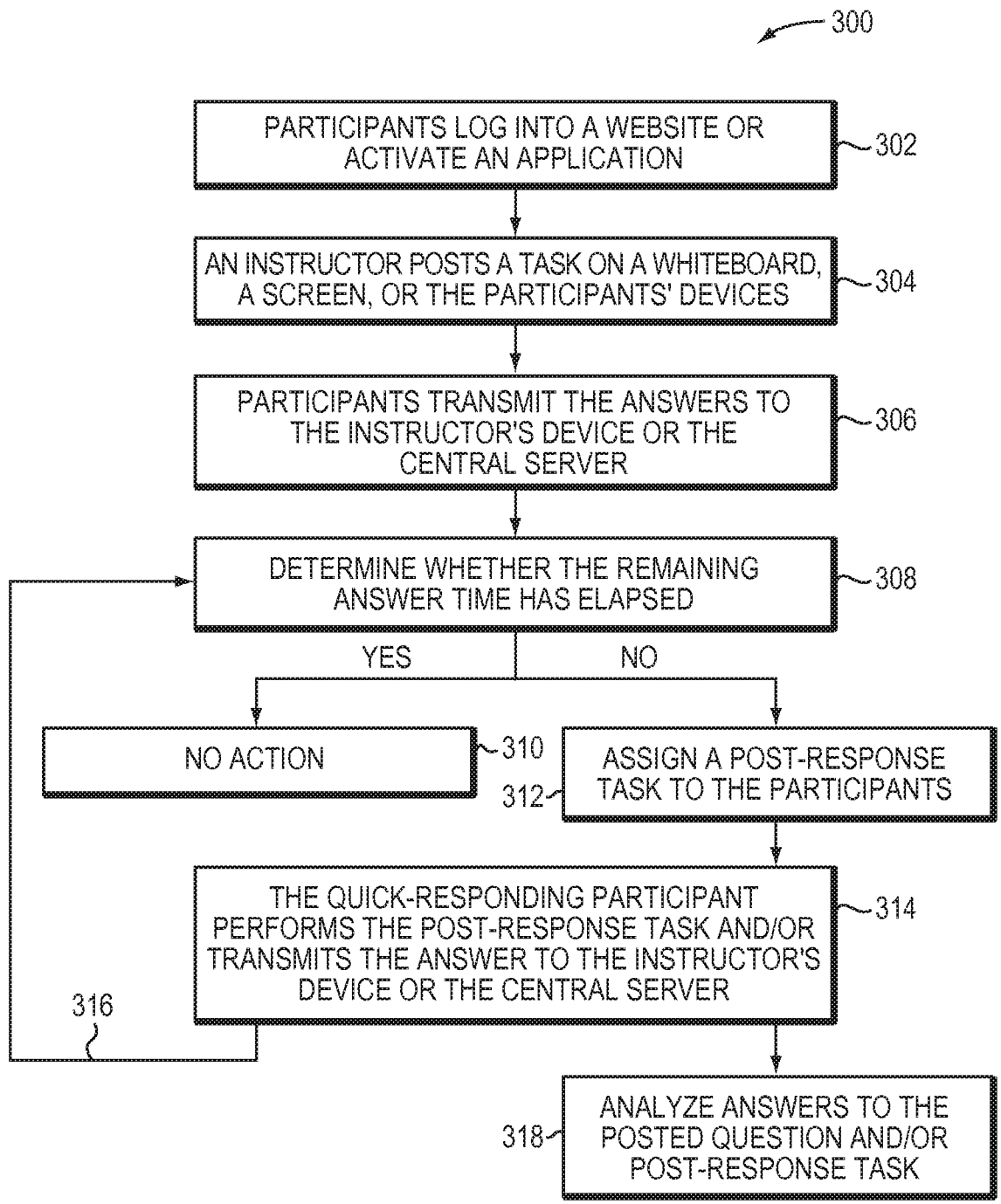
FIG. 3 depicts a method for managing the off-task time of quick-responding participants in an event in accordance with embodiments of the current invention.

A representative method 300 for managing the off-task time of quick-responding participants in an activity in accordance with embodiments of the current invention is shown in FIG. 3. In a first step 302, the participants 110 are required to log into a website or activate an application associated with the activity. In a second step 304, the instructor 130 poses a question or task on a screen, whiteboard or the participants' devices 120. In a third step 306, the participants 110 transmit their answers to the instructor's device 140, either directly or via the central server 145. Upon receiving the answers, the instructor's device 140 or the central server 145 determines whether the answer time set by the instructor 130 has expired (step 308). If so, no action is taken until a request from the instructor 130 is received (step 310). If, however, there is remaining answer time, the instructor's device 140 or the central server 145 assigns a post-response task to the quick-responding participant (step 312). The post-response task may be generic to every participant, a question that another instructor is pre-testing for her own course, and/or customized based on the remaining answer time and/or the rate at which the participant has successfully provided answers to previous questions. The quick-responding participant may then enter her answer to the post-response task using the device 120 that can, again, communicate with the instructor's device 140 directly or indirectly (step 314). In various embodiments, multiple post-response tasks are sequentially assigned to the quick-responding participant until the answer time expires (step 316). The post-response task thus effectively keeps the quick-responding participant engaged in the activity. In addition, the website and/or application required for the activity may prevent the quick-responding participant from wandering to other tasks irrelevant to the current subject matter. The answers to the originally posed question and/or post-response task may be analyzed for, e.g., improving a later version of the question and/or post-response task, building profiles of each participant's ability level in the subject matter and/or grouping the participants 110 (step 318).

Figure 4:
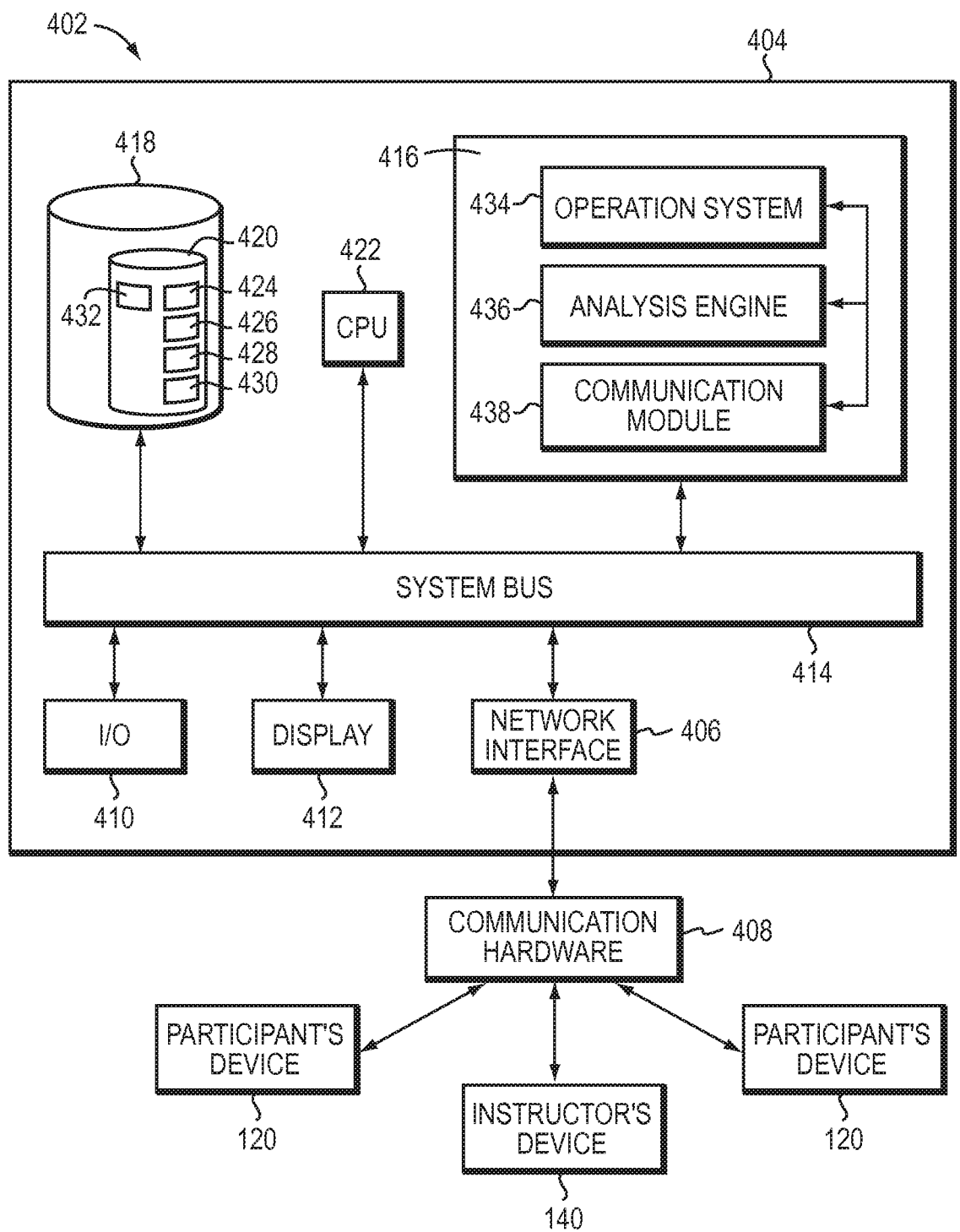
FIG. 4 illustrates a system for managing the off-task time of quick-responding participants in an event in accordance with embodiments of the current invention.

A system for managing the post-response time of quick-responding participants in an activity in accordance with embodiments of the current invention is shown in FIG. 4. The system involves a server 402 that comprises or consists of a general-purpose computing device in the form of a computer 404 including a network interface 406, which interacts with the participants' electronic devices 120 and/or instructor's device 140 via communication hardware (a telephone line, a local area or wide area network, etc.) 408. The computer 404 also includes input/output devices 410 (e.g., a keyboard, a mouse or other position-sensing device, etc.), by means of which a participant 110 can interact with the system, and a screen display 412. The computer 404 further includes a bi-directional system bus 414, over which the system components communicate, a main (typically volatile) system memory 416, and a non-volatile mass storage device (such as one or more hard disks and/or optical storage units) 418, which can contain one or more databases 420 storing multiple records as further described below. In some embodiments, one or more of the databases 420 is deployed in a separate device accessible to the server 402 via the network interface 406. The operation of computer 404 is directed by a central-processing unit ("CPU") 422.

The databases 420 may include a question database 424, a post-response task database 426, answer databases 428 with answers to the respective questions and post-response tasks, a participant database 430, and/or a stream database 432. These databases may be stored on separate devices or may be separate logical or physical partitions on a single device. Each question in the question database 424 and/or each post-response task in the post-response task database 426 is stored as a record with fields that may include, for example, an answer time, a display time, and/or a level of difficulty associated therewith. The server 402 is in wired or, more typically, wireless communication with the participants' devices 120 and broadcasts questions to the participants upon command of the instructor 130 or at preprogrammed points during a presentation delivered by the instructor 130. Participants' answers to questions may be stored, either as associated records in the question database 424 or in a separate answer database 428. Similarly, participants' responses to post-response tasks may be stored as associated records in the post-response task database 426 or in a separate response database 428. In various embodiments, a participant database 430 stores identifiers of the participants 110 and their electronic devices 120, and if the participants 110 have been grouped, each participant record contains a field for the group. In some embodiments, a stream database 432 contains video clips or other content (or pointers thereto) to be sent to the electronic devices 120 during off-task times upon the command of instructor 130.

The main memory 416 contains instructions, conceptually illustrated as a group of modules, that control the operation of CPU 422 and its interaction with the other hardware components. An operating system 434 directs the execution of low-level, basic system functions such as memory allocation, file management and operation of mass storage devices 418. The operating system 434 may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The server 402 may execute an analysis engine 436 that accesses the participants' answers and tailors post-response tasks based thereon as described above; the server 402 then wirelessly directs these tasks to specific participants via a communication module 438. In various embodiments, the communication module 438 is a conventional component (e.g., a network interface or transceiver) designed to provide communications with a network, such as the Internet and/or any other land-based or wireless telecommunications network or system, and, through the network, with the participants' electronic devices 120. Different participants may receive different post-response tasks depending, for example, on whether the answer is correct and/or when they provided their answers and how many answers have been accumulated at that point (since the nature of the post-response tasks may be dictated by the answers thus far received).

The analysis engine 436 may be implemented by computer-executable instructions, such as program modules, that are executed by a conventional computer. Generally, program modules include routines, programs, objects, components, data structures, etc. that performs particular tasks or implement particular abstract data types. Those skilled in the art will appreciate that the invention may be practiced with various computer system configurations, including multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

Any suitable programming language may be used to implement without undue experimentation the analytical functions described above on the server 402, the participants' devices 120, and/or the instructor's device 140. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The server 402 and database 420, the participants' devices 120, and the instructor's device 140 may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/ nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing units that execute commands and instructions may be general-purpose processors, but may utilize any of a wide variety of other technologies including special-purpose hardware, a microcomputer, mini-computer, mainframe computer, programmed micro-processor, microcontroller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

As noted, the participants' devices 120 and/or the instructors device 140 typically communicate with the server 402 via a wireless link, but communication may take place in any convenient manner, e.g., via a wired or wireless local area network (LAN) and a wide area network (WAN), wireless personal area network (PAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed:

1. A method of managing data transmissions to electronic devices communicatively couplable with a participation-management computer, the method comprising:

processing, by a participation-management computer, a respective identifier for each participant device of a plurality of participant devices;

transmitting a first question to the plurality of participant devices, the plurality of participant devices comprising a first participant device that provides the first question via a first application, where:

access to content with one or more applications other than the first application is blocked when the first application is in use, and a timer associated with the first question tracks time corresponding to the first question and identifies when a stop time is reached;

consequent to receiving a response to the first question from the first participant device:

determining, using the timer, a remaining amount of time before the stop time is reached, and identifying a post-response task for provisioning with the first participant device by determining that a time duration associated with the post-response task is less than or equal to the remaining amount of time, where the post-response task comprises additional information and/or an additional question identified based in part on whether the response demonstrates sufficient understanding of content the first question is to clarify; and transmitting the post-response task to the first participant device, wherein the first participant device is enabled to interact with the post-response task until the stop time is reached.

2. The method of claim 1, further comprising:
processing, by the participation-management computer, an indication of performance of the post-response task.

3. The method of claim 2, further comprising:
analyzing the response to the first question and/or the indication of the performance of the post-response task; and based at least in part on the analyzing, creating a later version of the first question and/or a later version of the post-response task.

4. The method of claim 2, further comprising:
analyzing the response to the first question and/or the indication of the performance of the post-response task; and based at least in part on the analyzing, generating a profile corresponding to the first participant device.

5. The method of claim 2, further comprising:
analyzing the response to the first question and/or the indication of the performance of the post-response task; and based at least in part on the analyzing, differentiating the plurality of participant devices in to different groups.

6. The method of claim 1, wherein the participation-management computer controls the stop time at least in part by adjusting the stop time.

7. The method of claim 1, wherein the participation-management computer controls a display of the first participant device until the stop time is reached.

8. One or more non-transitory, machine-readable media having machine-executable instructions, which, when executed by one or more processing devices, causes the one or more processing devices to perform actions comprising:

processing a respective identifier for each participant device of a plurality of participant devices;

causing transmitting a first question to the plurality of participant devices, the plurality of participant devices comprising a first participant device that provides the first question via a first application, where:
   access to content with one or more applications other than the first application is blocked when the first application is in use, and
   a timer associated with the first question tracks time corresponding to the first question and identifies when a stop time is reached;
consequent to receiving a response to the first question from the first participant device:
   determining, using the timer, a remaining amount of time before the stop time is reached, and
   identifying a post-response task for provisioning with the first participant device by determining that a time duration associated with the post-response task is less than or equal to the remaining amount of time, where the post-response task comprises additional information and/or an additional question identified based in part on whether the response demonstrates sufficient understanding of content the first question is to clarify; and
causing transmitting the post-response task to the first participant device, wherein the first participant device is enabled to interact with the post-response task until the stop time is reached.

9. The one or more non-transitory, machine-readable media of claim 8, the actions further comprising:
   processing an indication of performance of the post-response task.

10. The one or more non-transitory, machine-readable media of claim 9, the actions further comprising:
   analyzing the response to the first question and/or the indication of the performance of the post-response task; and
   based at least in part on the analyzing, creating a later version of the first question and/or a later version of the post-response task.

11. The one or more non-transitory, machine-readable media of claim 9, the actions further comprising:
   analyzing the response to the first question and/or the indication of the performance of the post-response task; and
   based at least in part on the analyzing, generating a profile corresponding to the first participant device.

12. The one or more non-transitory, machine-readable media of claim 9, the actions further comprising:
   analyzing the response to the first question and/or the indication of the performance of the post-response task; and
   based at least in part on the analyzing, differentiating the plurality of participant devices in to different groups.

13. The one or more non-transitory, machine-readable media of claim 8, wherein a participation-management computer controls the stop time at least in part by adjusting the stop time.

14. The one or more non-transitory, machine-readable media of claim 8, wherein a participation-management computer controls a display of the first participant device until the stop time is reached.

15. A system to manage data transmissions to electronic devices communicatively couplable with a participation-management computer, the system comprising:
   one or more processors; and
   one or memories coupled with the one or more processors, wherein the one or more processors and the one or more memories are configured to perform actions comprising:
   processing a respective identifier for each participant device of a plurality of participant devices;
   causing transmitting a first question to the plurality of participant devices, the plurality of participant devices comprising a first participant device that provides the first question via a first application, where:
      access to content with one or more applications other than the first application is blocked when the first application is in use, and
      a timer associated with the first question tracks time corresponding to the first question and identifies when a stop time is reached;
   consequent to receiving a response to the first question from the first participant device:
      determining, using the timer, a remaining amount of time before the stop time is reached, and
      identifying a post-response task for provisioning with the first participant device by determining that a time duration associated with the post-response task is less than or equal to the remaining amount of time, where the post-response task comprises additional information and/or an additional question identified based in part on whether the response demonstrates sufficient understanding of content the first question is to clarify; and
   causing transmitting the post-response task to the first participant device, wherein the first participant device is enabled to interact with the post-response task until the stop time is reached.

16. The system of claim 15, the actions further comprising:
   processing an indication of performance of the post-response task.

17. The system of claim 16, the actions further comprising:
   analyzing the response to the first question and/or the indication of the performance of the post-response task; and
   based at least in part on the analyzing, creating a later version of the first question and/or a later version of the post-response task.

18. The system of claim 16, the actions further comprising:
   analyzing the response to the first question and/or the indication of the performance of the post-response task; and
   based at least in part on the analyzing, generating a profile corresponding to the first participant device.

19. The system of claim 16, the actions further comprising:
   analyzing the response to the first question and/or the indication of the performance of the post-response task; and
   based at least in part on the analyzing, differentiating the plurality of participant devices in to different groups.

20. The system of claim 15, wherein the participation-management computer controls the stop time at least in part by adjusting the stop time.

* * * * *